(12) United States Patent
Cooper

(10) Patent No.: US 12,500,305 B1
(45) Date of Patent: Dec. 16, 2025

(54) BATTERY MODULE OR PACK AND METHOD OF CONSTRUCTION

(71) Applicant: Triston Cooper, Lincoln, IL (US)

(72) Inventor: Triston Cooper, Lincoln, IL (US)

( * ) Notice: Subject to any disclaimer, the term of this patent is extended or adjusted under 35 U.S.C. 154(b) by 607 days.

(21) Appl. No.: 17/834,283

(22) Filed: Jun. 7, 2022

(51) Int. Cl.
*H01M 50/213* (2021.01)
*H01M 10/04* (2006.01)
*H01M 50/179* (2021.01)

(52) U.S. Cl.
CPC ..... *H01M 50/213* (2021.01); *H01M 10/0404* (2013.01); *H01M 50/179* (2021.01)

(58) Field of Classification Search
CPC ....... H01M 50/20–298; H01M 50/213; H01M 50/238; H01M 50/242; H01M 50/244; H01M 50/249; H01M 50/258; H01M 50/289; H01M 10/0404; H01M 10/0422

See application file for complete search history.

(56) References Cited

U.S. PATENT DOCUMENTS

| | | | |
|---|---|---|---|
| D197,335 S | 1/1964 | Guild | |
| 4,247,603 A | 1/1981 | Leffingwell | |
| D585,372 S | 1/2009 | Foreman | |
| D632,651 S | 2/2011 | Foreman | |
| D638,790 S | 5/2011 | Daniel | |
| 8,785,028 B1 * | 7/2014 | Saiki | H01M 50/1243 |
| | | | 429/121 |
| 9,991,496 B2 | 6/2018 | Grass | |
| 10,199,696 B2 | 2/2019 | Moon et al. | |
| 10,319,978 B2 | 6/2019 | Zeng et al. | |
| 10,593,988 B2 | 3/2020 | Xiao et al. | |
| D907,584 S | 1/2021 | Mizutani | |
| D994,592 S | 8/2023 | Cohn | |
| 2002/0025473 A1 * | 2/2002 | Peterson | H01M 50/213 |
| | | | 429/185 |
| 2008/0131764 A1 * | 6/2008 | Saiki | H01M 50/227 |
| | | | 429/149 |
| 2012/0015227 A1 | 1/2012 | Hwang | |
| 2012/0258335 A1 | 10/2012 | Bae | |
| 2012/0308849 A1 | 12/2012 | Tortstensson | |
| 2013/0180684 A1 | 7/2013 | Gong | |
| 2022/0045395 A1 | 2/2022 | Zeiler et al. | |

FOREIGN PATENT DOCUMENTS

| | | | |
|---|---|---|---|
| KR | 20150025236 A | | 3/2015 |
| KR | 20160200645 A | * | 2/2016 |
| KR | 101636378 B1 | | 7/2016 |
| KR | 20180044083 A | | 5/2018 |

OTHER PUBLICATIONS

Espacenet machine translation of KR-20160200645-A (Year: 2016).*
"Compress." Merriam-Webster.com Dictionary, Merriam-Webster, https://www.merriam-webster.com/dictionary/compress. Accessed Jul. 21, 2025. (Year: 2025).*

* cited by examiner

*Primary Examiner* — Jonathan G Leong
(74) *Attorney, Agent, or Firm* — Manatt, Phelps & Phillips, LLP

(57) ABSTRACT

A battery pack and method for assembly provide a battery pack that does not require spot welding and does not require bolts to maintain contact compression of the individual battery cells. In one embodiment, each individual cell is a 18650 size lithium ion rechargeable battery cell, but the battery pack can use any size, type or shape individual battery cells with an easy modification of parts of the battery pack.

16 Claims, 18 Drawing Sheets

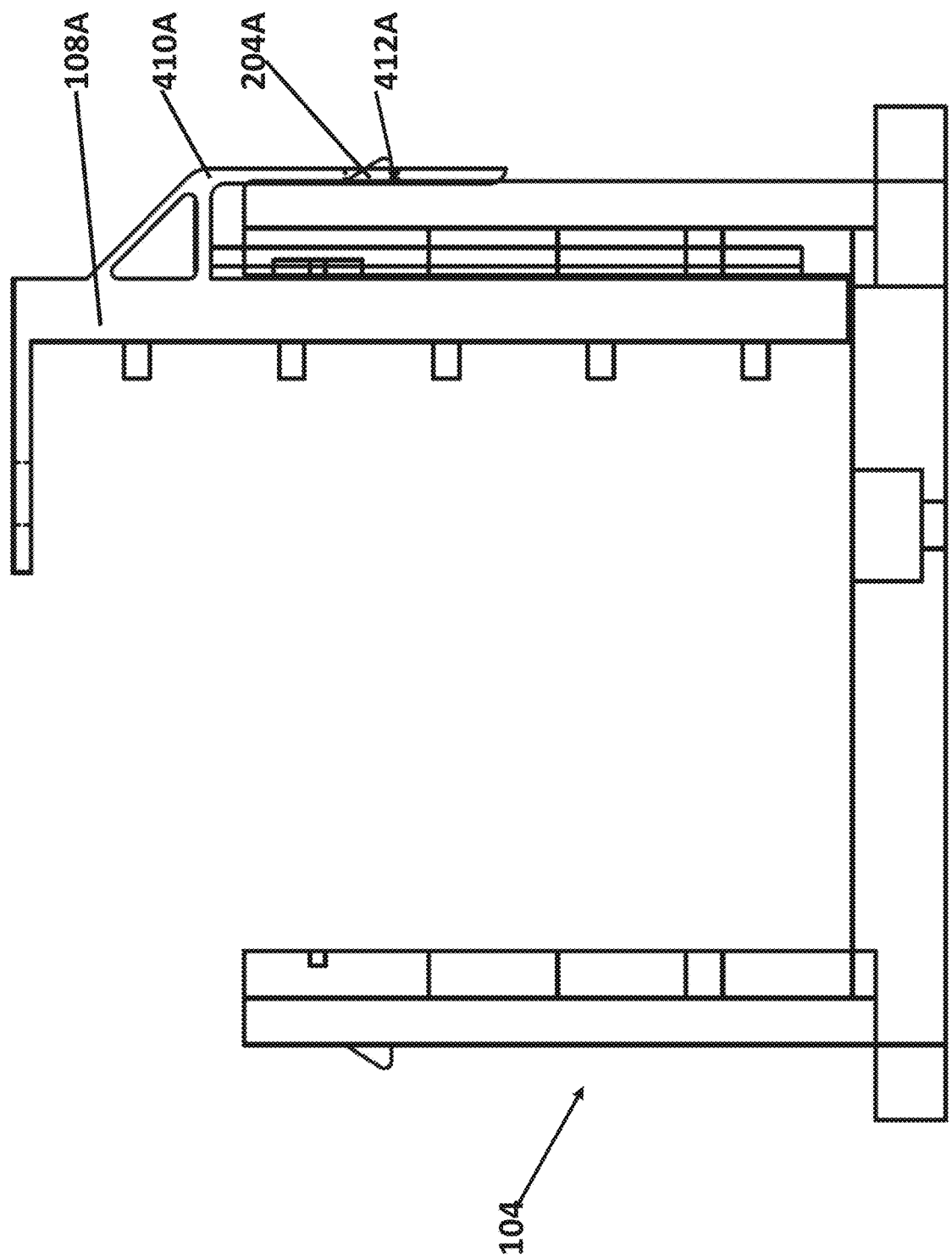

BATTERY MODULE OR PACK AND METHOD OF CONSTRUCTION

FIELD

The disclosure relates to a battery module or pack into which individual battery cells may be placed together and connected and a method for assembling the battery module or pack.

BACKGROUND

The interest in electrically powered devices and vehicles has exploded. In each of these vehicles, there is a battery package that holds a set of rechargeable batteries that provide power to the vehicle. A battery package typically has a number of individual battery cells that are connected together in series (depending on the desired current) by a conductive bus bar. These commercial battery packages are made using expensive technology including spot welding. It is desirable to permit an individual or hobbyist to create their own rechargeable battery packages without the costs and use of expensive technology used in the commercial battery packages.

As a result of this desire, multiple companies presently exist that provide kits for do it yourself (DIY) battery packages for rechargeable batteries. A very common rechargeable battery cells has a 18650 size that is a well-defined and known size of the battery and its external characteristics. These existing companies include VRU-ZEND (more details at vruzend.com), Agniusm (more details at 18650.lt/index.php/author/agniusm), Energus (more details at energusps.com/page/homepage) and Ann Power Technology Co., Limited (more details at annpower.diytrade.com). Each of these companies tend to follow a similar design of using nuts and bolts to compress their batteries with a conductive bus bar. This adds cost to the total parts list and does not account for mechanical frequency stress seen in mobile devices, which is common for battery packs. This mechanical stress can potentially damage the battery cells and the designers use their own connectors which can limit design preferences such as power rating. Furthermore, these designs that require nuts and bolts to compress the batteries can be dangerous.

It is desirable to provide a safer and less expensive way for making battery modules and to allow more flexibility in battery pack designs. Currently, most battery modules when done from a DIY perspective require spot welding techniques to connect cells together. Spot welding is a dangerous and costly technique when done by beginners and can completely dwarf the cost of the actual batteries when done by a professional. It is also desirable to have a battery module or pack that negates the need for spot welding while also allowing designers to replace cells that have gone bad or have gone past their lifetime. Thus, it is desirable to provide a novel battery module or pack and it is to this end that the disclosure is directed.

BRIEF DESCRIPTION OF THE DRAWINGS

FIGS. 7C and 7D are a front view and perspective views of the bottom port and the first side portion releasable connected together.

DETAILED DESCRIPTION OF ONE OR MORE EMBODIMENTS

Figure 1:
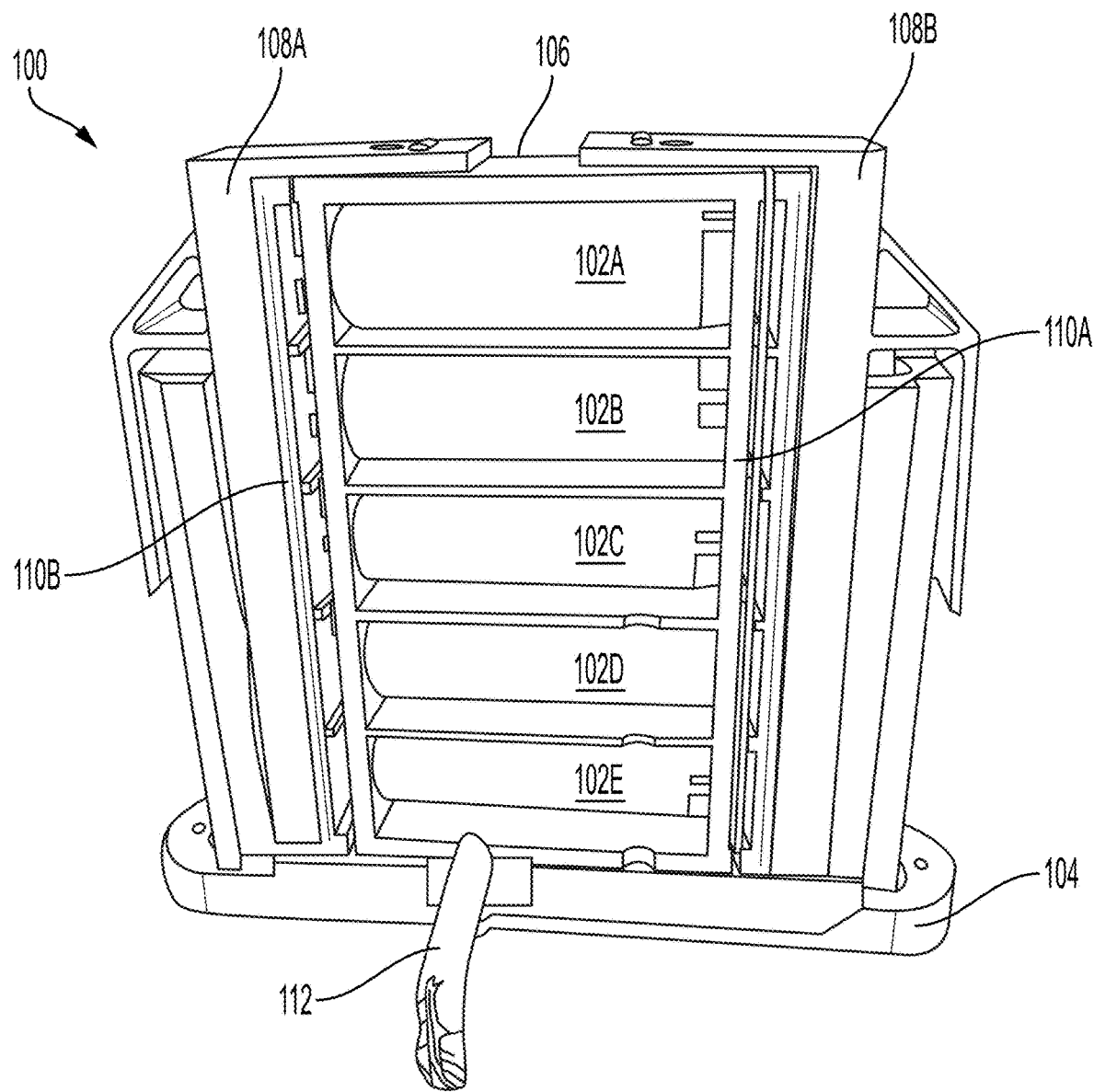
FIG. 1 is a diagram of an assembled battery module having five battery cells.

The disclosure is particularly applicable to a battery module or pack and method for assembly that uses 18650 size lithium ion rechargeable individual battery cells and it is in this context that the disclosure will be described. For purposes of the disclosure, a battery module is a device that has ten or fewer individual battery cells (FIGS. 1-11 and 13-15 are examples) while a battery pack has more than ten individual battery cells (such as the 30 cell embodiment shown in FIG. 12). It will be appreciated, however, that the battery module and pack has greater utility, such that the shape/size of the parts may be adjusted to work with any type or size of battery known in the art. For example, the battery module or pack may be created using any of the batteries whose dimensions are defined by standards that are made by organizations such as the International Electrotechnical Commission (such as a document known as IEC 61960) and the American national standards institute. A table of relevant cell battery sizes can be seen at www.powerstream.com/Size.htm that is incorporated herein by reference. Furthermore, as disclosed in a second embodiment, the battery pack may include any number of individual cells in the battery module or pack with the two disclosed embodiments having 5 cells and 10 cells so that various currents may be generated by the assembled battery module or pack based on a number of battery cells connected in series. The battery module or pack also may have either a series configuration or a parallel configuration in which each battery cells is connected in series or parallel depending on the desired voltage or current characteristics for the assembled battery module or pack. For example, a low voltage, high current battery module or pack may be achieved in the parallel configuration or a high voltage, low current battery module or pack may be achieved in the parallel configuration Unlike the known battery modules that require spot welding and bolts to maintain contact compression with the individual battery cells, the novel disclosed battery module or pack does not require spot welding or bolts to maintain contact compression resulting in a battery module or pack that is easier to assemble or disassemble. The easier assembly/disassembly allows designers to replace cells that have gone bad or have gone past their lifetime. The novel battery module or pack also increases the safety of making battery modules and to allow more flexibility in battery pack design. Due to its ability to replace batteries and its ease of scalability, this device also allows engineers to make custom packs easily, safely, and cheaply.

The disclosed battery module or pack and method of assembly uses mechanical compression to allow the batteries to contact a conductive bus bar. The compression is done through clip on parts that slide into each other, that when put together, will securely keep the battery cells together and connected to each busbar. In one embodiment, the busbar may be a braided tinned copper wire (whose width and thickness can change based on current requirements) that is flexible or compressible as compared to the common solid bar that is seen in most other battery pack kits. This flexibility/compressibility allows the busbar to maintain constant contact with the battery even during high vibration situations while also preventing the battery from being too compressed (which can cause possible damage long term). This design allows for easy deconstruction which permits design changes and adjustments without hassle. The use of the tinned copper and cheapness of plastic materials allows for battery module or pack design to be very flexible while lowering the overall cost for larger scales.

FIG. 1 is a diagram of an assembled battery module 100 having five battery cells that does not require spot welding or a bolt for contact compression. The module 100 may have a bottom port 104, a main body 106 that sits in the bottom port 104 and houses a plurality of individual battery cells 102 (five individual battery cells 102A-102E in one embodiment), a first side portion 108A and a second side portion 108B that interface with the main body 106 and the bottom port on each side of the main body 106 as shown in FIG. 1. The assembled battery module 100 may also have an electrical connector 112 that extends out each side of the bottom port 104 (only one electrical connector 112 is shown in FIG. 1) so that the electrical power from the plurality of battery cells may be harnessed and used to power other electrical circuits. As shown in FIG. 1, the main body 106 may have a slot 110A, 110B on each side of the main body 106 through which each electrical connector 112 is threaded as described below in more detail.

In one embodiment, each piece of the battery module 100 (other than the electrical connector 112) may be made of plastic or other materials that are insulative and do not conduct electrical current. A preferred plastic may be Polylactic acid (PLA) plastic which is a common 3D printer filament and may be used since PLA is inexpensive, makes the parts easy to construct and the use of this plastic can make large manufacturing possible with plastic injection molding. Other materials such as Polyethylene terephthalate glycol (PETG) or Acrylonitrile butadiene styrene (ABS) plastic filaments can be used as they are also good plastics for 3D printing and plastic molding. Overall, meltable plastics are preferred since they can be used in a 3D printer, but any nonconductive material (such as wood) can be used to build the parts if alternative manufacturing methods are available.

The assembled battery module 100 is easy to assemble/disassemble for various reasons including no spot welding being required and no bolts being required to create the contact compression that keeps all of the individual battery cells 102 connected to the electrical connectors 112. Each electrical connector 112 establishes (when pressed against each battery cell 102 by a post of each side portion 108A, 108B (described below in more detail) the contact compression using mechanical compression without a bolt. Furthermore, the electrical connection between each battery cell 102 and the electrical connector(s) 112 obviates the need for spot welding. Furthermore, the pieces of the battery module 100 may be easily disassembled so that the individual battery cells 102 may be easily removed or replaced.

Figure 2:
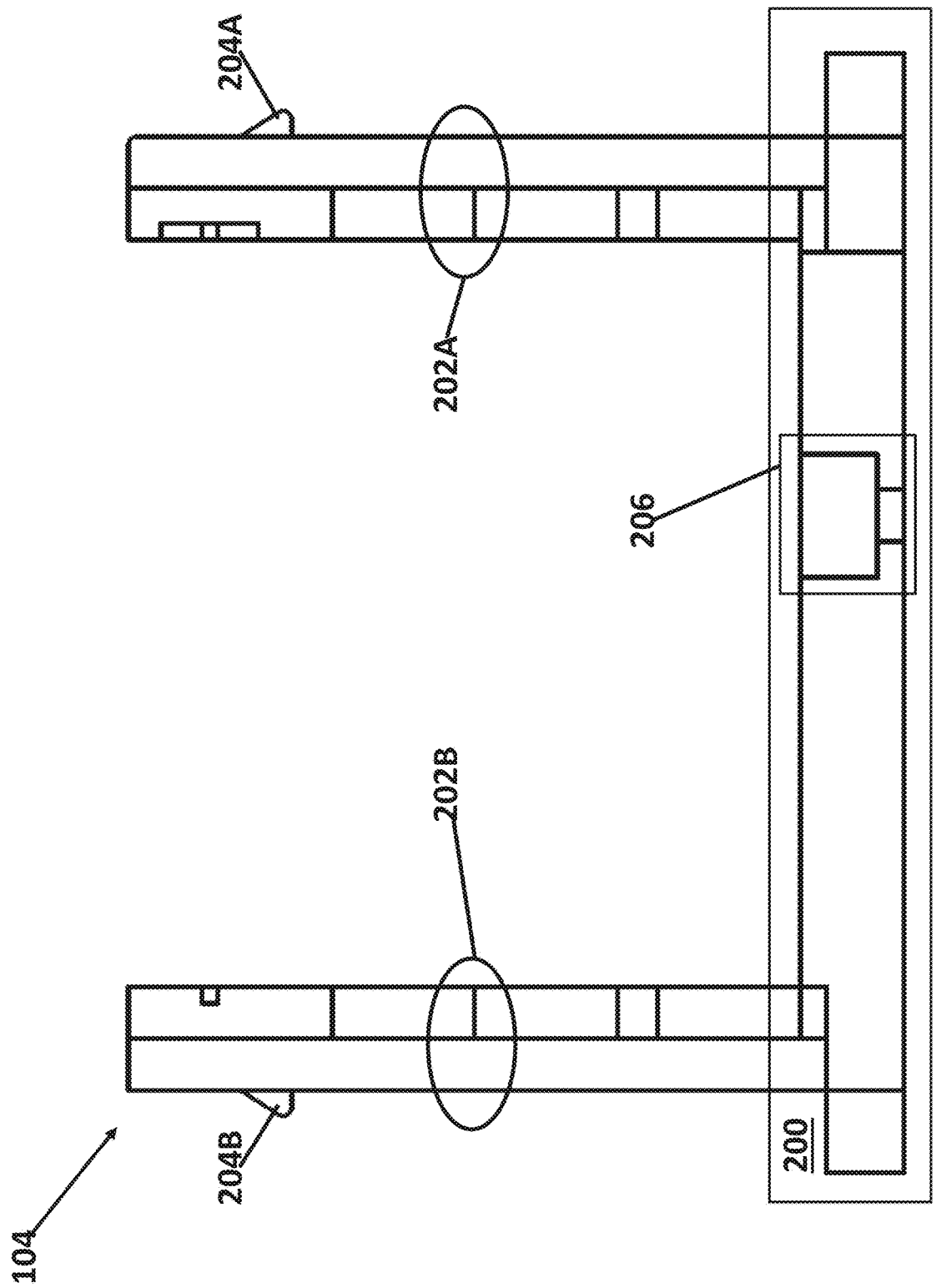
FIG. 2 is a side view of a bottom port of the battery module of FIG. 1.
Figure 6:
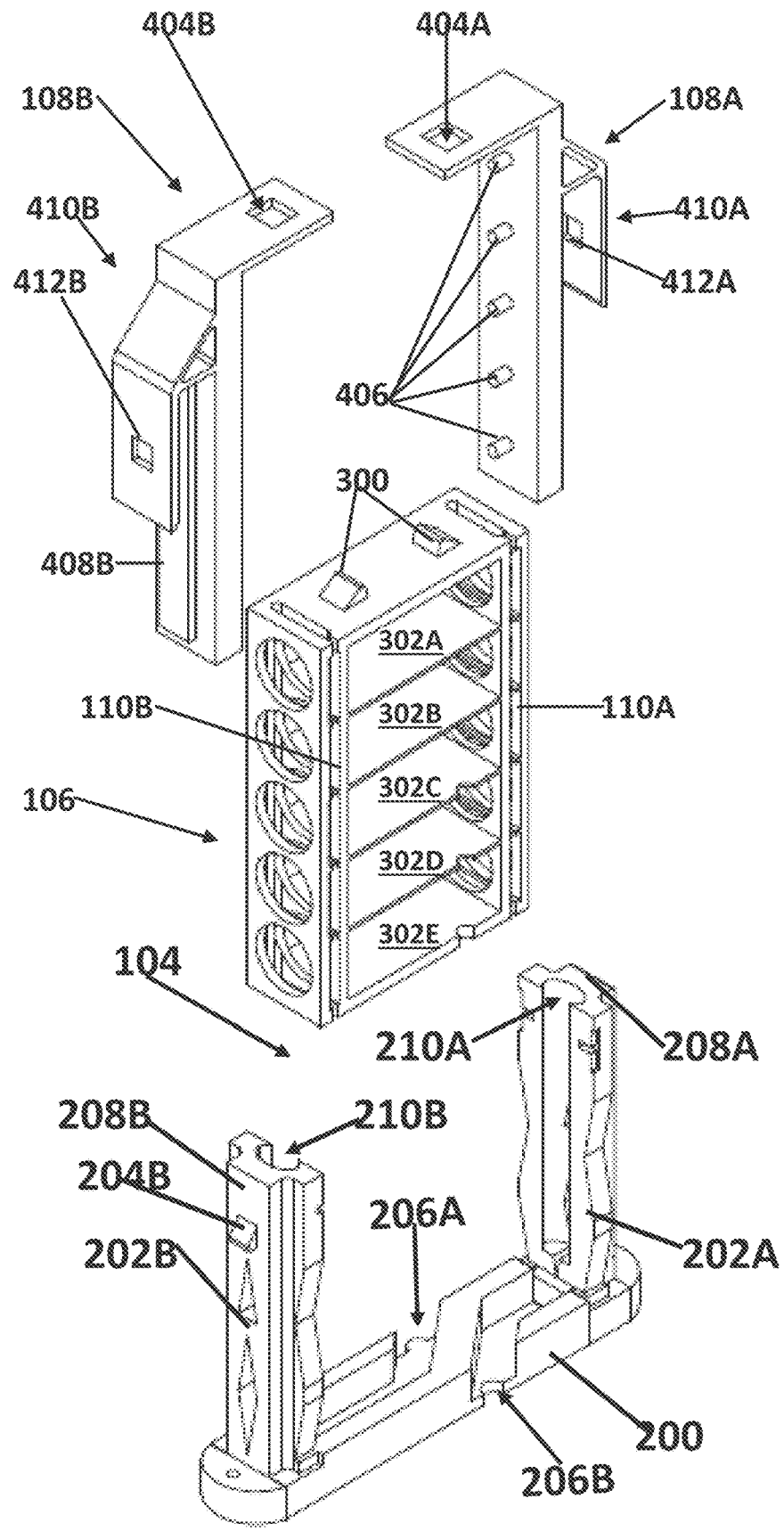
FIG. 6 is a perspective view assembly diagram of the battery module of FIG. 1.

Further details of the bottom port 104 are shown in FIG. 2 (a side view of a bottom port 104 of the battery module) and FIG. 6 (a perspective view assembly diagram of the battery module 100). The bottom port may have a generally U shape into which the main body 106 is secured. The bottom port 104 may have a base region 200 and a first and second leg region 202A, 202B connected to the base region 200. The first and second leg regions 202A, 202B may each be perpendicular to the base region 200 and the first and second leg regions 202A, 202B may have a distance between the first and second leg region 202A, 202B that is greater than a width of the main body 106 so that there is a gap between each side of the main body 106 and the legs 202A, 202B and the main body 106 sits inside first and second leg regions 202A, 202B when the battery pack 100 is assembled as shown in FIG. 1. In the various embodiments, a tolerance of about 1 mm or less may be the space between the main body and each side portion when the batter module or pack is assembled. If the battery module 100 holds additional battery cells (See FIG. 7 for a ten battery cell example) or fewer battery cells, then a width of the main body 106 is smaller or larger resulting in a smaller or larger distance between the legs 202A, 202B thus maintaining the gap between the main body 106 and the legs 202A, 202B.

As shown in FIG. 2, each leg portion 202A, 202B may further include a detent 204A, 204B that interfaces with a void/hole 412 in each of the first and second side portions 108A, 108B (discussed below) that, when the battery module 100 is assembled, snaps into the void in each of the side portions to anchor each side portion to the bottom port 104 of the battery module 100. The bottom port 104 may also have a connector channel 206 for each electrical connector (that may be formed in the base region 200) that permits each electrical connector in an assembled main body to be routed out of the assembled battery module 100 as shown in FIG. 1 for one of the electrical connectors.

As shown in FIG. 6, a first and second connector channel 206A, 206B are shown. Each connector channel 206A, 206B starts at a bottom of the main body 106 when it sits in the bottom port 104 and extends to an exit point on each side of the base region 200. Each connector channel 206A, 206B is sized such that it allows the connector 112 on each side of the assembly main body 106 to be routed out of the assembled battery module 100 and insulates each connector from the other connector to prevent shorting. Each leg 202A, 202B of the bottom port 104 may have a raised portion 208A, 208B on an outside surface and a channel region 210A, 210B on an inside surface. The raised portions 208A, 208B (that may have a rectangular shape) may have the detent 204A, 204B (described above) formed thereon and may interface with the first and second side portions 108A, 108B and hold the bottom region 104 and first and second side portion 108A, 108B together when the battery module is assembled. The channel region 210A, 210B (that may have an arcuate shape) may interface with an outer portion of each first and second side portions 108A, 108B and also hold the bottom region 104 and first and second side portion 108A, 108B together when the battery pack is assembled. Thus, as shown in FIG. 6, the bottom port 104 has a set of features (208, 210) that interface with the first and second side portions 108A, 108B to hold the main body 106 in the assembled battery module.

Figure 3:
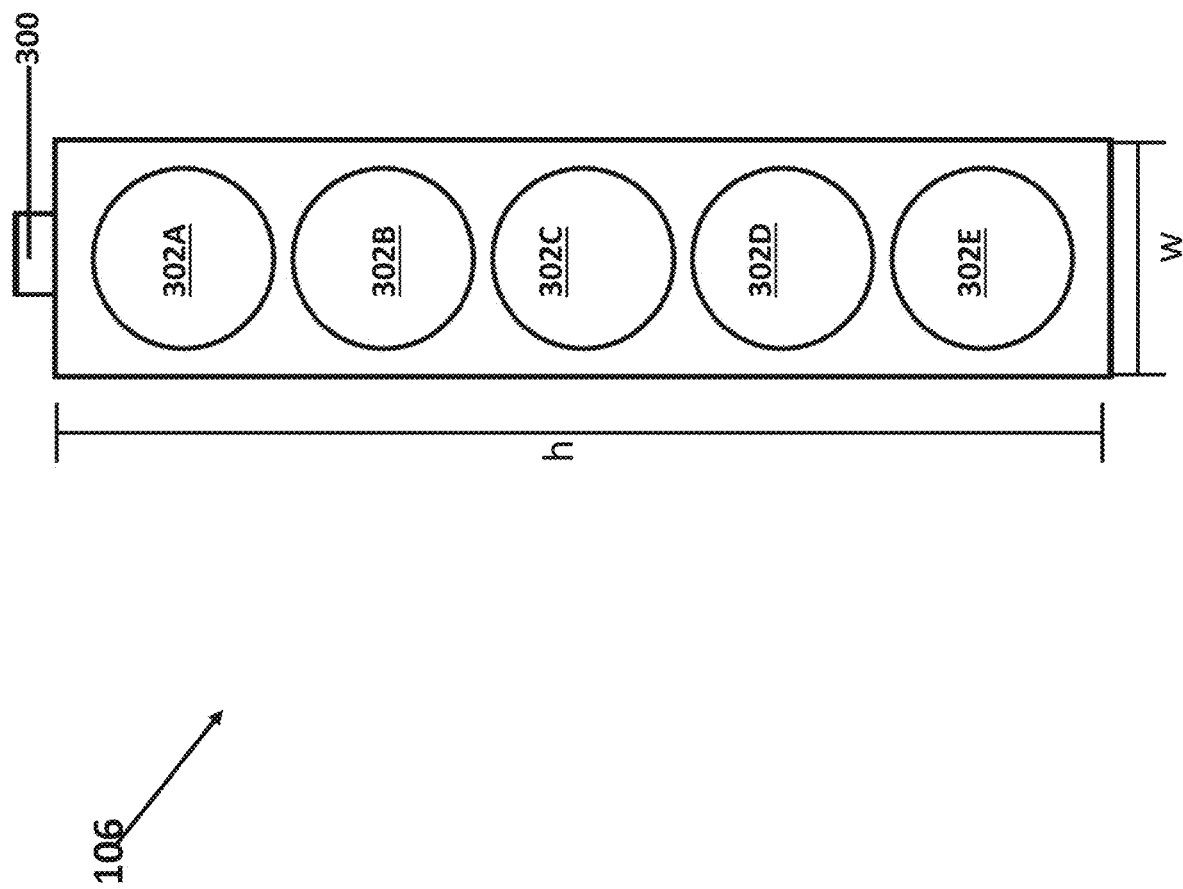
FIG. 3 is a side view of a main body of the battery module of FIG. 1.
Figure 5:
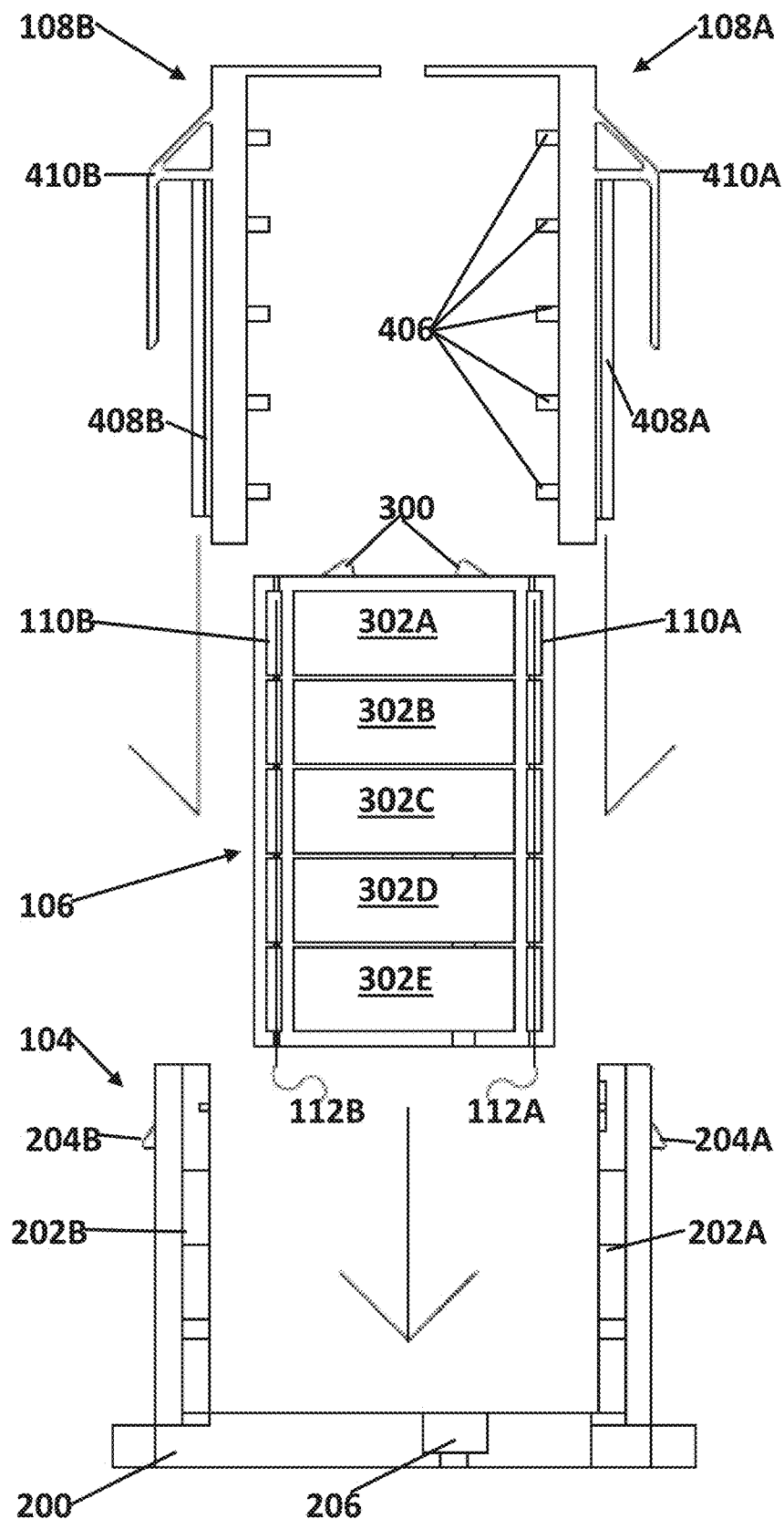
FIG. 5 is a front view assembly diagram of the battery module of FIG. 1.

Further details of the main body 106 are shown in FIG. 3 (a side view), FIG. 5 and FIG. 6 (a perspective view assembly diagram of the battery module 100). The main body 106 preferably has a rectangular shape due to the sizes, shapes of the battery cells, but could be other shapes and sized to accommodate other battery cells. The main body as shown in FIG. 3 may have a width, w, that is slightly wider than each battery cell and may have a set of detents 300 on top of the main body that interface with a set of voids 404 in each of the first and second side portions 108A, 108B to help releasably attach the two portions together. The main body 106 also has a battery cell holder 302 (such as battery cell holders 302A-302E for a five cell battery pack) that is shaped and sized for the particular cells of the battery module or pack and each battery cell rests on a bottom of its own battery cell holder 302. In the example shown in FIG. 3, 18650 rechargeable cells with a round cross section are used and each battery cell holder 302 has a length, L, shown in FIG. 5 that may be as long as the length of each battery cell. Each battery cell holder 302 ensures that the each battery cells is aligned and held in place so that the mechanical compression contact may be formed when the battery module is assembled.

Figure 7A:
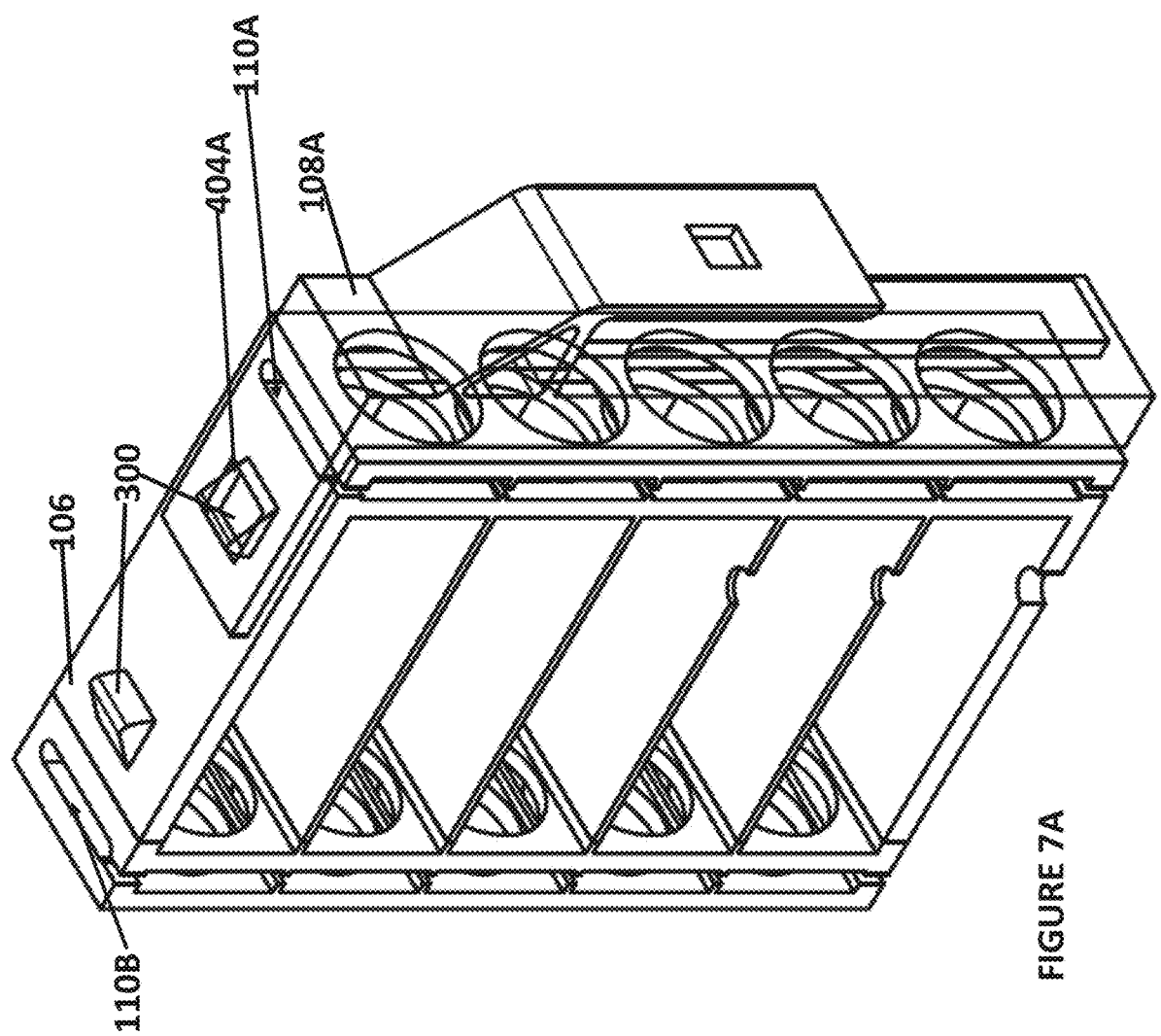
FIGS. 7A and 7B are a front view and perspective views of the main body and the first side portion releasable connected together.

As shown in FIGS. 5 and 6, the main body 106 may have the busbar/connector slot 110A, 110B at each end of the main body 106 that is positioned between an end of each battery cell holder 302 and an outer wall of the main body 106. As shown in FIG. 7A, each slot 110A, 100B extends from a top to the bottom of each side of the main body 106. The busbar/connector slot 110A, 110B permit a busbar/electrical connector 112A, 112B (shown in FIG. 5) to be inserted into each side of the main body 106. As a result, the first busbar 112A can make an electrical connection with a first end of each battery cell (each anode or each cathode) and the second busbar 112B can make an electrical connection with a second end of each battery cell (each cathode if the first busbar is capable of being connected to each anode or each anode if the first busbar is capable of being connected to each cathode) so that the battery cells are electrically connected in series to each other.

Figure 4:
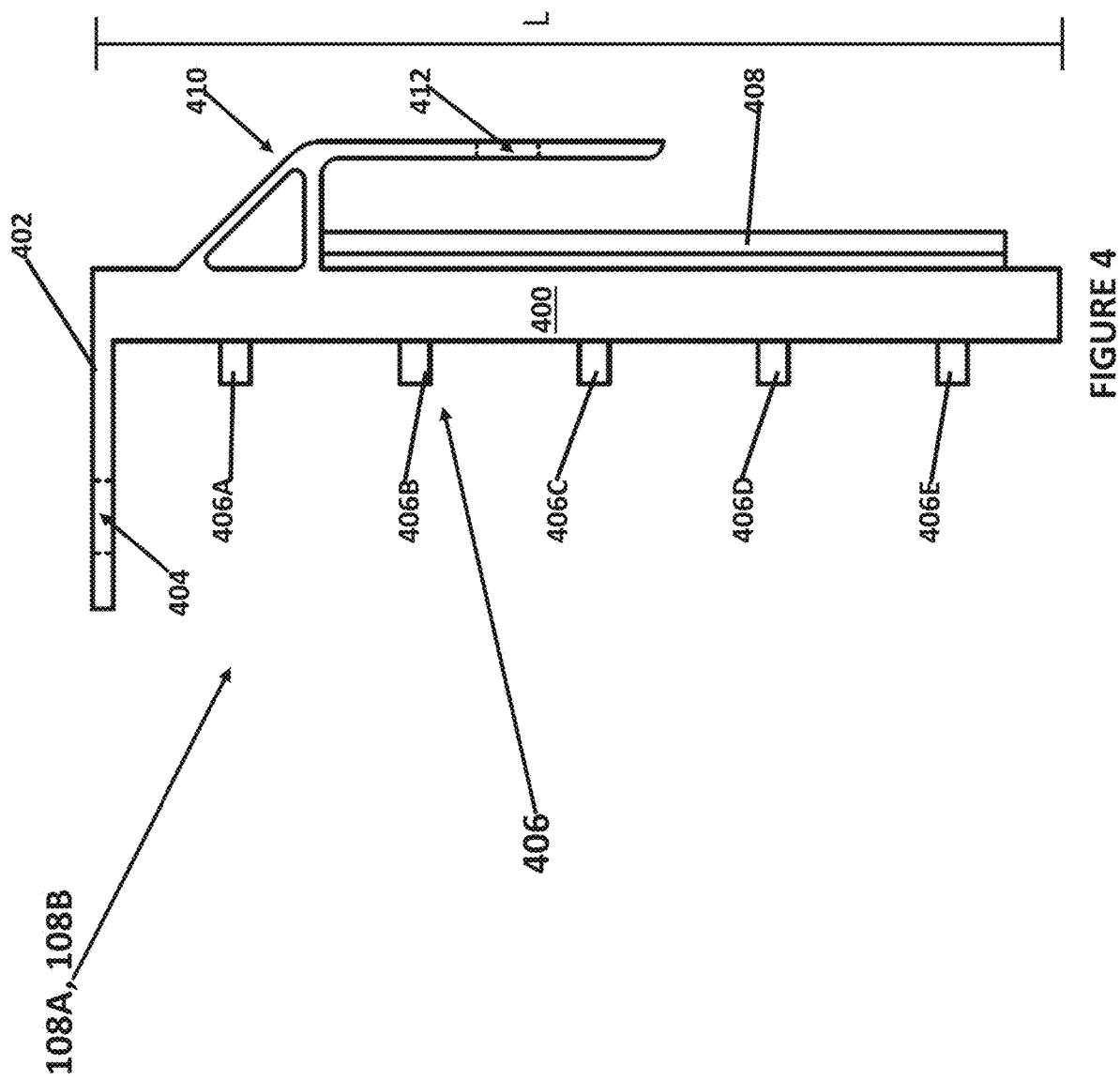
FIG. 4 is a side view of a side portion of the battery module of FIG. 1.
Figure 7B:
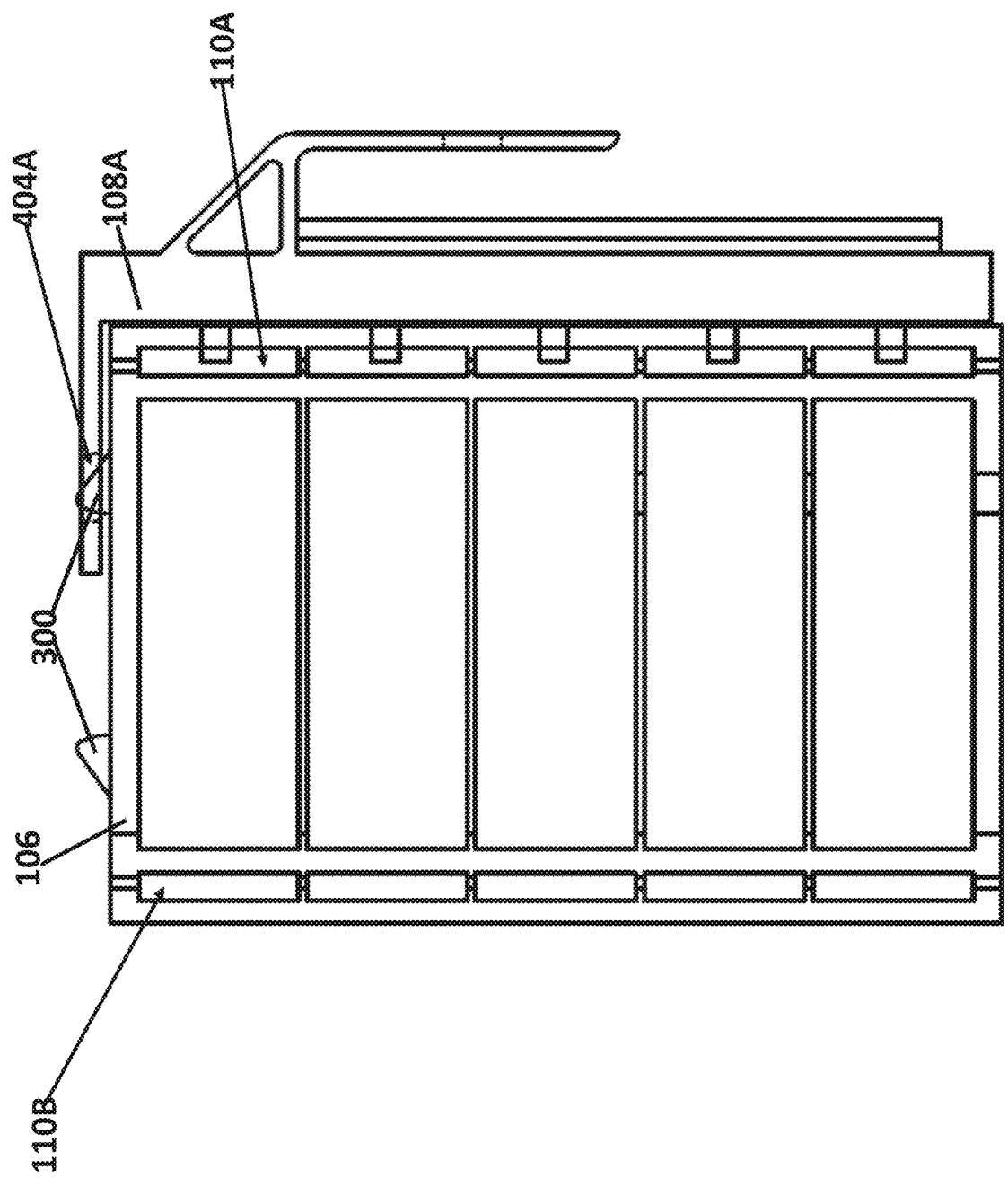
Figure 7D:
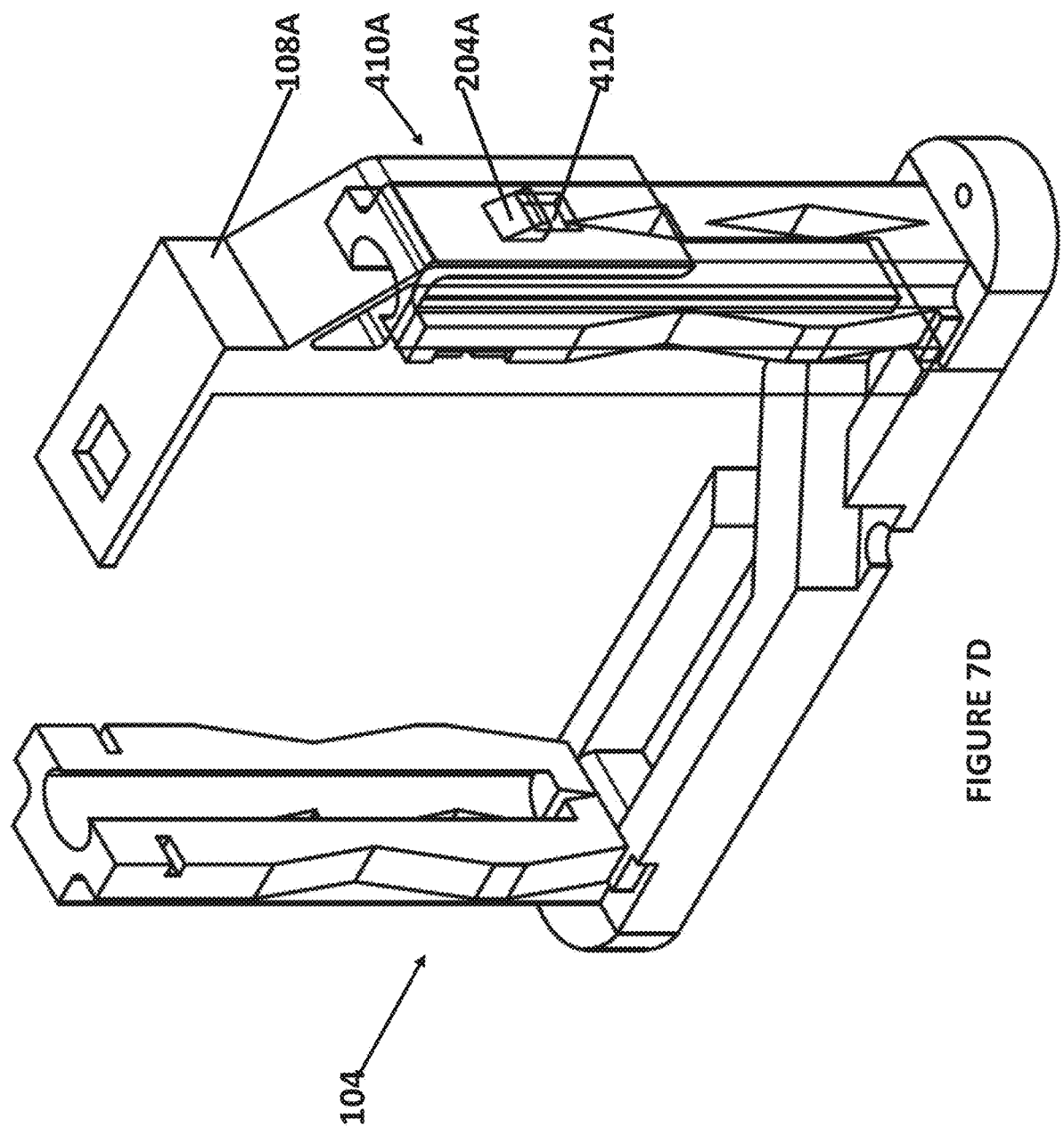

Further details of each side portion 108A, 108B are shown in FIG. 4 (a side view), FIG. 5 and FIG. 6 (a perspective view assembly diagram of the battery module 100), FIGS. 7A-7B that show the main body releasably connected to side portion 108B and FIGS. 7C-D that show the bottom port releasably connected to the side portion 108B. Each of the first and second side portions 108A, 108B has the same characteristics and elements and each has a L shape with an arm portion 400 that has a length, L, equal to a height, h, of the main body 106 shown in FIG. 3 and a top portion 402 that is at approximately a right angle to the arm portion 400 that forms the L shape. The top portion 402 has a void/hole 404 that interfaces with the detents 300 of the main body 106 (shown in FIGS. 3, 5 and 6) when the battery pack is assembled. The arm portion 400 has a plurality of posts 406 (that may be round as shown in FIG. 6 or have other shapes) such as posts 406A-406E for the five battery cell embodiment shown in FIGS. 4-6. When each side portion 108A, 108B is attached to the main body 106, each post 406 is aligned with each battery cell already situated in the main body 106 and presses the electrical connector 112 against an end of each battery cell to create the mechanical compression contact. Each side portion 108A, 108B also acts as a shield for the connector 112 in each connector slot 110A, 100B to prevents short circuits and accidental touching by a user.

As shown in FIGS. 7A-7B, the main body 106 that has the detents 300 and one of the side portions 108A is pressed against a side of the main body 106 adjacent a side of each battery cell. To releasably secure the side portion 108B to the main body 106, the detent 300 snap fits into the void/hole 404 of the side portion 108A. As noted elsewhere, this detent and hole connection can be released by flexing the top of the side portion 108A so that the detent 300 is no longer retained in the hole 404. The same attachment/connection mechanism attaches the other side portion 108B to the main body 106 that is not shown in FIG. 7A or 7B.

Each side portion 108A, 108B also may include a mesa portion 408 on a side of the arm portion 400 opposite of the posts 406 (that may be rectangular shaped) that slides into the channel region 210A, 210B on each side of the bottom port 104 is releasably attach the side portions 108A, 108B (when assembled with the main body 106) to the bottom port 104. Each side portion 108A, 108B also may include an attachment arm 410 connected to a top of the arm portion 400 above the mesa portion 408 (as shown in FIG. 6). The attachment arm 410 may have a void/hole 412 into which the detents 204A, 204B rest when the battery module is assembled.

As shown in FIGS. 7C-7D, the bottom port 104 is releasably connected to the side portion 108A. The releasably connect/secure them together, the mesa portion 408A slides into the channel region 210A of the bottom port 104 and the side portion 108A is slide down the arm of the bottom port 104. As the side portion approaches the bottom port 104, the hole/void 412A of the attachment arm 410A of the side portion 108A slides over the detent 204A of the bottom port 104. The detent 204A snaps into the hole/void 412A and is retained in the hole/void 412A. The retaining of the detent 204A in the hole/void 412A releasably secures the side portion 108A to a side of the bottom port 104. As noted elsewhere, this detent 204A and hole 412A connection can be released by flexing the top of the side portion 108A so that the detent 204A is no longer retained in the hole 412A. The same attachment/connection mechanism attaches the other side portion 108B to the bottom port 104 that is not shown in FIG. 7C or 71).

Figure 7E:
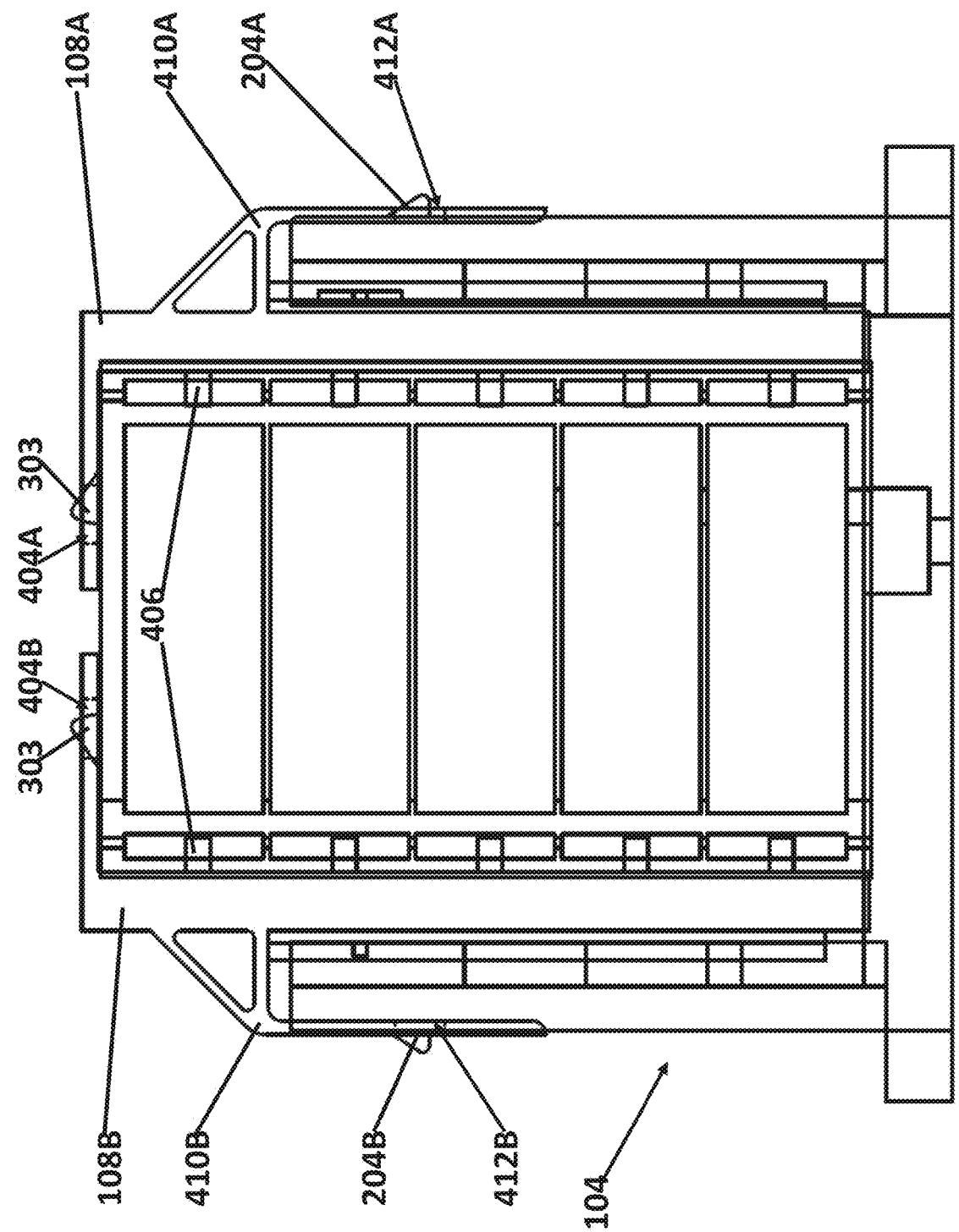
FIG. 7E shows a front view of the assembled battery module for five battery cells.

FIG. 7E shown the assembled battery module 100 with all of the elements releasably connected together. For example, each detent 300, 204A, 204B is seated and retained by each void/hole 404A, 404B, 412A, 412B of the side portions 108A, 108B to releasably secure the pieces together while creating the required mechanical compression of each battery cell. The mechanical compression is generated by the post 406 on each side portion 108A, 108B that presses against each side of each battery cell.

Figure 8:
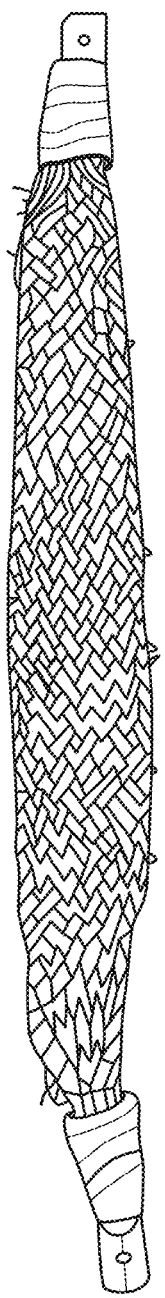
FIGS. 8 and 9 are battery connectors that are part of the battery module.
Figure 9:
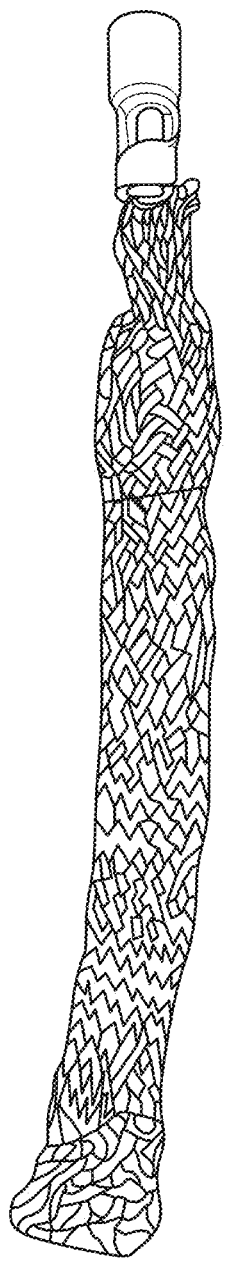

FIGS. 8 and 9 are battery connectors 112 that are part of the battery module or pack. In the embodiment shown in FIGS. 8-9, a braided tinned copper wire may be used as each electrical connector (also called a busbar). In the embodiment in FIGS. 8 and 9, the braided tinned copper wire may be used since it can be more easily compressed by the set of posts of the first and second side portions 108A, 108B against the end of each battery cell. However, any material that is electrically conductive and is susceptible to being compressed may be used for the electrical connector/busbar 112. Furthermore, each electrical connector/busbar 112 could be any other material or configuration that can create the compressive contact with the battery cells and conduct electricity.

Figure 10:
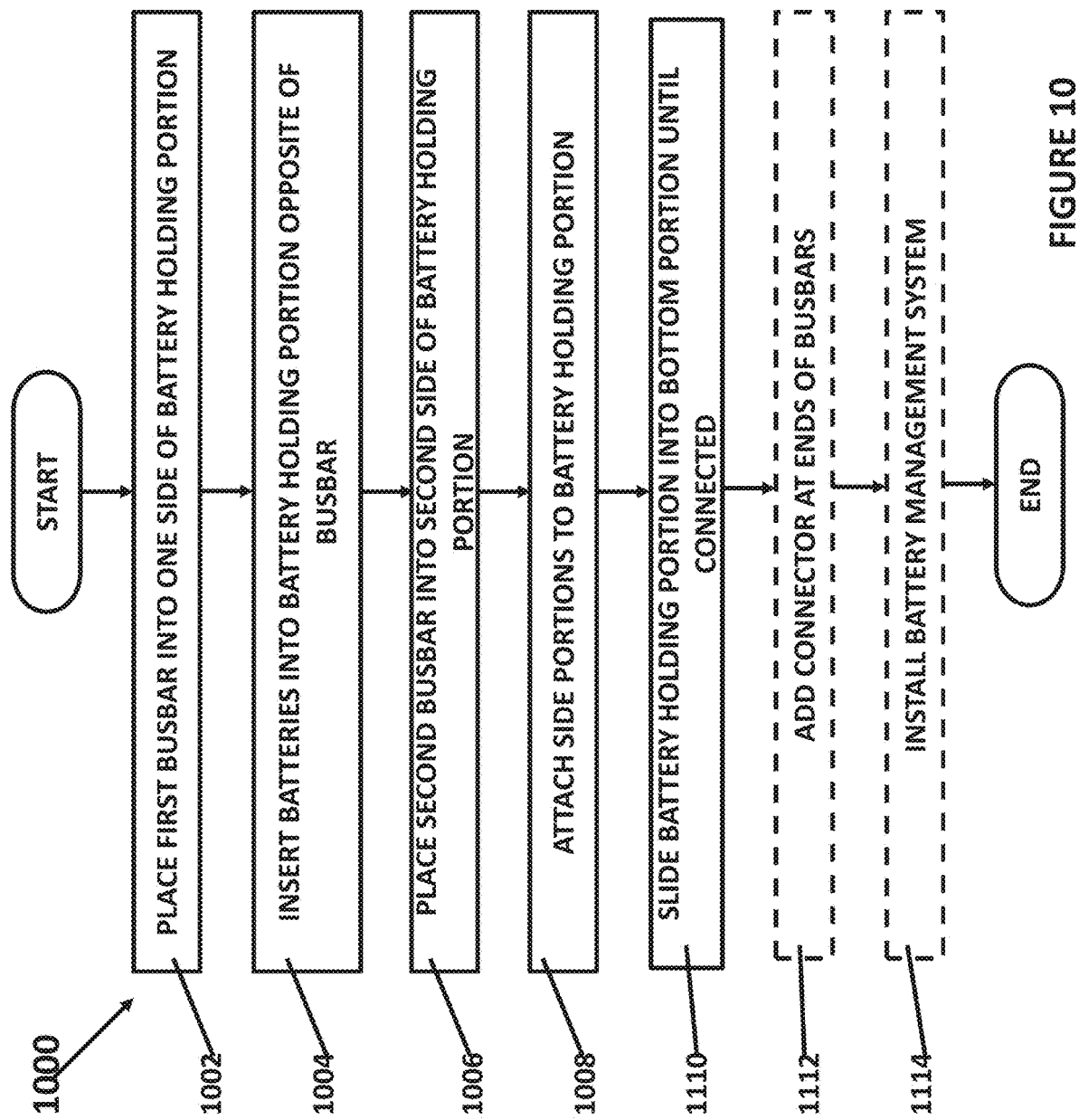
FIG. 10 is a flowchart of a method for assembly for the battery module.

FIG. 10 is a flowchart of a method 100 for assembly for the battery module or pack in whatever configuration including the 5 cell and 10 cell embodiments described above as well as other different size or shape battery packs. In the flowchart, optional processes are shown in dashed lines and the method may or may not be performed using those optional processes. While the method 100 is for assembly of the battery module or pack, the battery module or pack can be similarly disassembled. To assemble the battery module or pack, a first busbar 112A may be placed into one side of the main body (1002). Each busbar 112, in a preferred embodiment, may be a braided tinned copper wire that may be slid down a slot in the first side of the main body 106 so that it is adjacent to an end of each individual battery cell. The plurality of individual battery cells may be inserted into the main body 106 on a second side of the main body 106 opposite of the bus bar (1004). Each battery may be slid into its place in the main body 106 so that an end (the anode or cathode) of each battery cell is adjacent the first busbar Once the individual battery cells are inserted, a second busbar may be inserted into the second side of the main body 106 (1006) so that the first and second busbars 112A, 112B, when the battery module or pack is assembled, electrically connect each of the same ends (cathode or anode) on each battery cell together. It is critical that each battery has its anode electrically connected to the other anodes of the other battery cells by one busbar and its cathode electrically connected to the other cathodes of the other battery cells by the other busbar. With both busbars being inserted into the main body 106, the first and second side portions (108A, 108B) may be attached to the main body 106 (1008) in the manner discussed above. When the first and second side portions are attached, the set of posts in each side portion press against the busbar of each side and press the busbar against an end of each individual battery cell creating the compression contact between each battery cell and the busbar without the typical bolts.

After the side portions 108A, 108B are attached, the main body 106 and the side portions 108A, 108B are placed into the bottom port 104 (1110) until each of the portions 104, 106, 108A, 108B are securely connected together as described above. When the main body 106 and the side portions 108A, 108B are placed into the bottom port 104, each busbar 112A, 112B that extends out from a bottom of the main body 106 may be placed into each connector channel/tunnel of the bottom port 104 to ensure that a short circuit does not occur and cannot occur in the assembled battery module or pack.

The assembly method 1000 is complete after this process 1110, but several optional processes also may be performed. For example, a connector may be attached to the end of each busbar (1112) that extends from the assembled battery module or pack to make it easier to electrically connect the battery module or pack to other components. The connectors may be crimped or soldered onto each busbar. Furthermore, a known battery management system may be included with the battery pack (1114) to provide known battery management functions/processes to the assembled battery module or pack.

Since the battery module or pack is assembled by detents of one portion snapping into a void in another portion to secure the portions together, the detents may be removed from the voids and the portions separated from each other for disassembly. Furthermore, once disassembled, the busbars and the individual battery cells may be removed.

Figure 11:
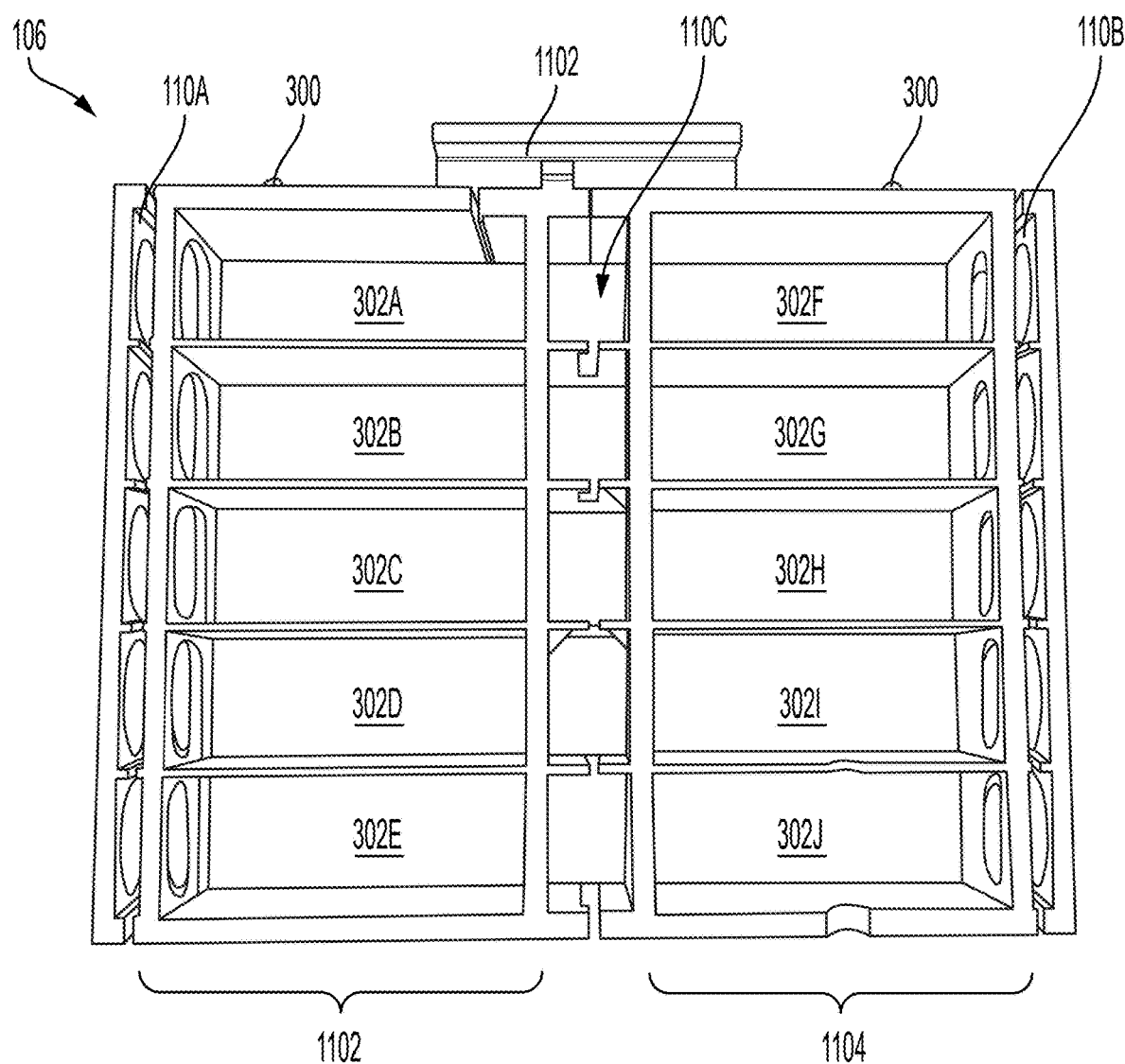
FIG. 11 show a main body for a battery module having ten battery cells.

FIG. 11 is a main body 106 for a ten battery module embodiment. Like the five cell embodiment, this main body 106 holds each battery cell as described above and creates the mechanical compression on each battery cell using the posts 406 of the side portions 108A, 108B when assembled. As shown in FIG. 11, the main body 106 has a battery cell holder 302 for each of the ten battery cells (302A-302J) arranged as shown with a left portion 1102 and a right portion 1104 that each hold five battery cells. This embodiment of the main body 106 has the two connector slots 110A, 100B at end side of the main body 106. Due to the ten cells, this embodiment further comprises a middle connector slot 110C that runs the length of the main body between the two sets of battery cells and holds a middle connector/busbar and a shield 1102 that shields the middle busbar/connector to prevent short circuits or accidental touching by the user. This embodiment has the same detents 300 on a top portion so that the side portions 108A, 108B may be releasably connected to each side of the main body 106 like the other embodiment.

Figure 12:
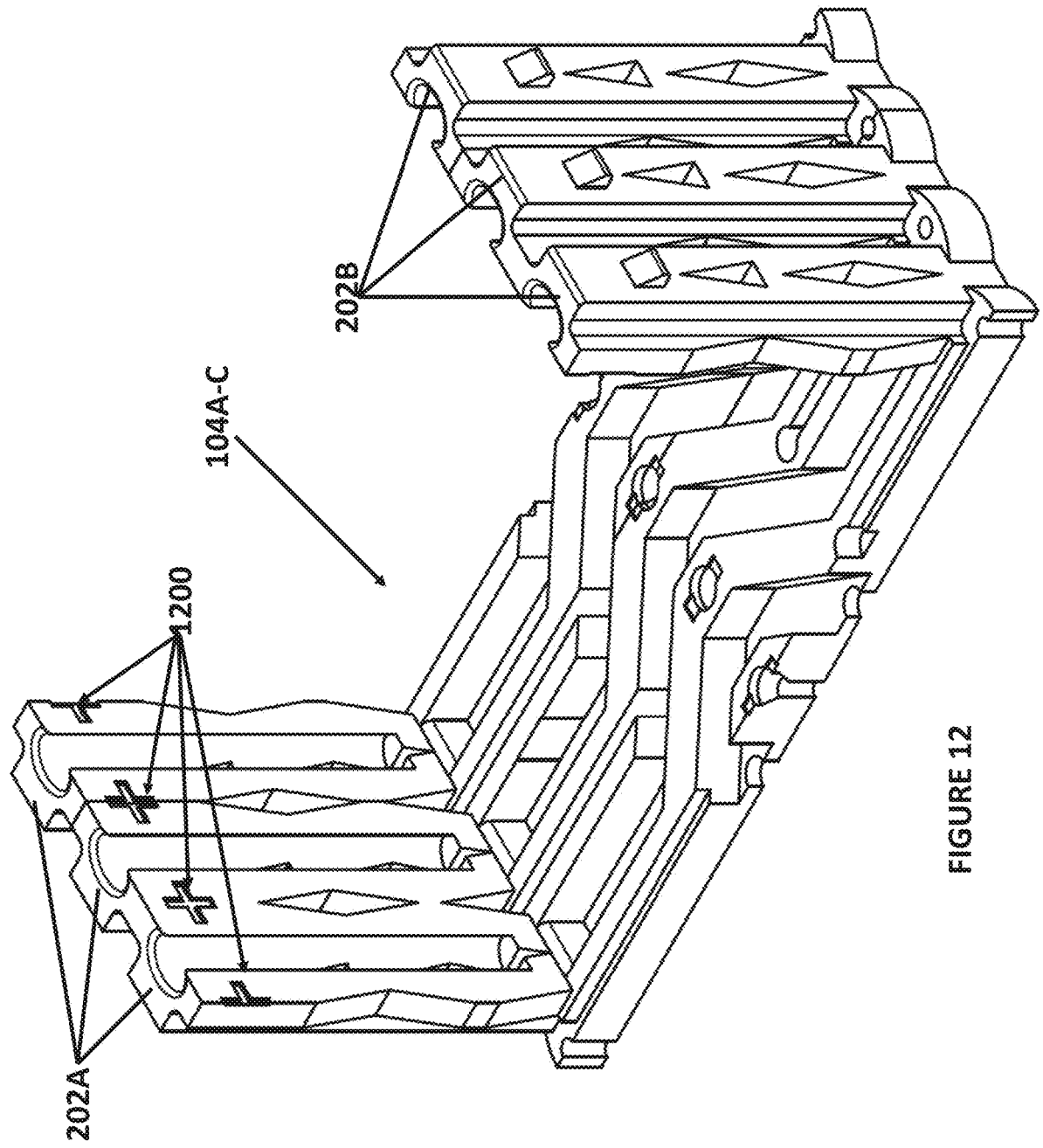
FIG. 12 show a bottom port for a battery pack having 30 battery cells.

This ten cell embodiment of the main body 106 may be used in a series or a parallel configuration. The bottom port 104 for each different configuration (and a 30 battery cell configuration are shown in FIG. 12) and are described below. Furthermore, for the ten cell embodiment, the battery module may have two different parallel configuration and two different series configurations. In the first parallel ten cell configuration, the anodes of the left and right battery cells face out towards the two connector slots 110A, 100B and the cathodes facing inward toward the middle connector slot 110C. As a result, the two busbars in the two outside slots 110A 100B are connected together to connect together all of the anodes of the ten battery cells while the middle connector in the middle slot 110C is pressed against each cathode of each battery cells.

In a second parallel ten cell configuration, the anodes of the left and right battery cells face inwards toward the middle connector slot 110C and the cathodes face out towards the two connector slots 110A, 100B. As a result, the two busbars in the two outside slots 110A, 100B are connected together to connect together all of the cathodes of the ten battery cells while the middle connector in the middle slot 110C is pressed against each anode of each battery cells. Both of these parallel configurations result in a low voltage, high current battery pack.

In the series configuration, the anodes of the left portion face out towards the outer slots 110A, 100B while the cathodes of the left portion face in towards the middle slot 110C while the anodes of the right portion face in towards the middle slot 110C while the cathodes of the right portion face out towards the outer slots 110A-110B. In this series configuration, the middle busbar connects the right and left portion battery cells together in series (and thus does not extend out of the battery module) while the outer busbar are the connectors that carry the electrical energy from the series connected battery cells. The series configuration results in a high voltage, low current configuration battery pack. The bottom port 104 for these different configurations may be modified to make the battery cell orientation clear.

FIG. 12 show a bottom port 104 for a battery pack that has 30 battery cells in which ten cell bottom portions are used.

In the 30 cell configuration embodiment shown in FIG. 12, each main body has ten cells in parallel and the three main bodies are in series so that the total capacitance is equal to 10*3*battery rated capacitance and the total voltage is equal to 3*rated voltage. Note that, as shown in FIG. 12, each leg 202A. 202B of each bottom port 104 has a symbol 1200 (such as a "+" and/or a "−" symbol (the "+" symbol is shown in FIG. 12)) that ensures that the user inserts each battery cell with the proper orientation. Each bottom port 104A-104C has the same connector channels/troughs that direct the electrical connectors. The number of battery cells in the battery pack may thus be scaled by adding more ten cell bottom portions. As with the other embodiments, this embodiment may have the symbols 1200 on the sides of the bottom port (+ or − sign) 104 which will guide a user to properly label each wire. Furthermore, the troughs in the bottom port 104 will show where the wires should go when connecting multiple wires. In one embodiment, a user may be recommended to color coat the wires for which is positive and negative. In this 30 cell embodiment, the battery pack would have three main bodies 106 that are inserted into and secured into the bottom port 104 as described above.

Figure 13:
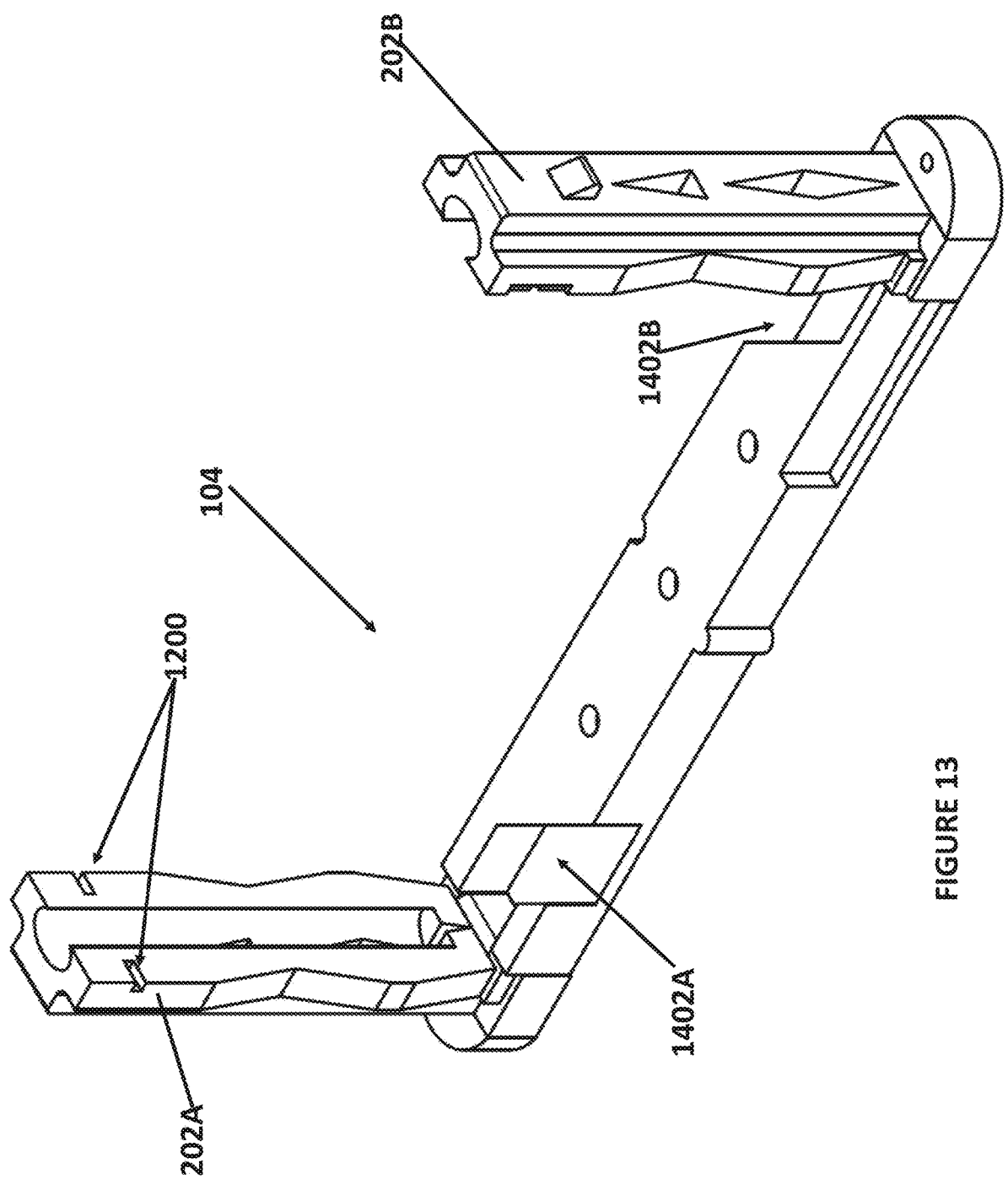
FIG. 13 shows a bottom port for a battery module having 10 cells with a series configuration.

FIG. 13 shows a bottom port 104 for a battery module having 10 cells with a series configuration that has the symbols 1200 on each leg 202A, 202B (with the "−" (negative) symbol shown in FIG. 13). The main body 106 may be slide into this bottom port 104 for a series configuration. For the series configuration, the bottom port may have a first trough 1302A and a second trough 1302B only since the middle busbar does not exist the assembled battery module 100. Like FIG. 12, the legs 202A, 202B are labeled to avoid a battery cell being inserted in a wrong orientation and the troughs 1302A, 1302B are different from the parallel configuration and also help the user put the battery cells into the main body 106 in the correct orientation.

Figure 14:
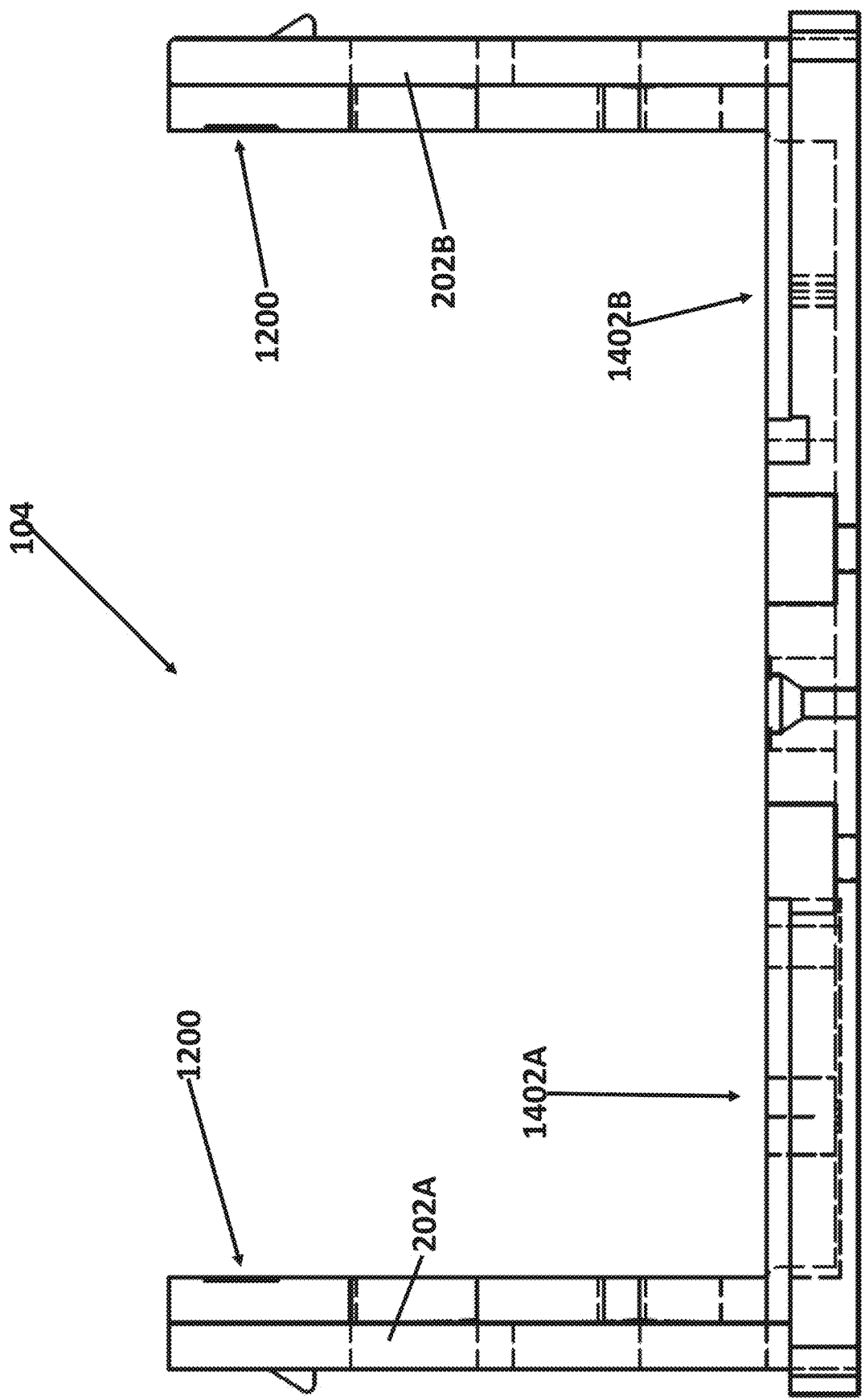
FIG. 14 is a front view for a main body capable of holding up to 10 cells.
Figure 15:
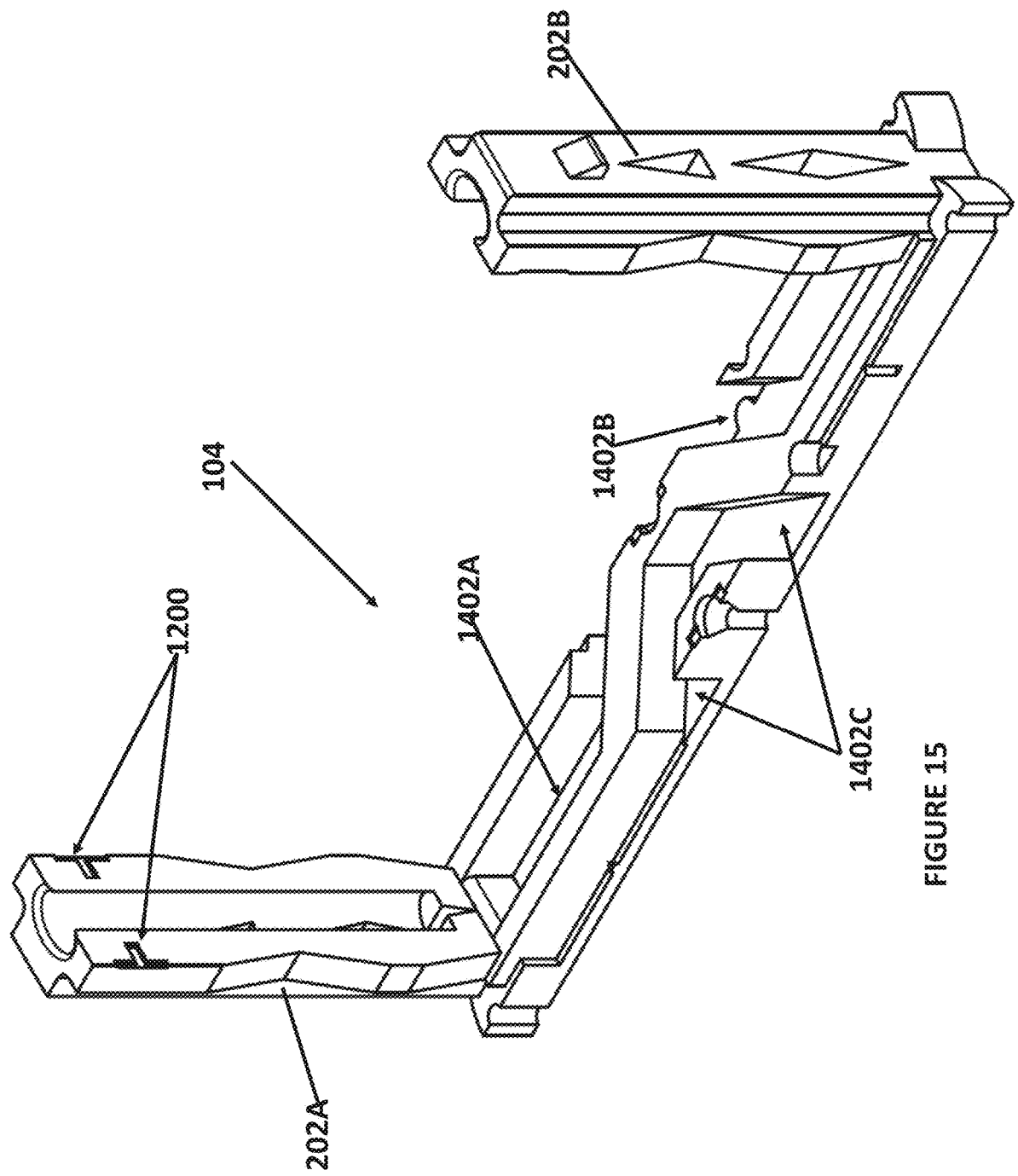
FIG. 15 is a perspective view for a bottom port that is capable of holding a ten cell main body that is using a parallel configuration to connect to other main bodies that are also using parallel configurations in a cascading parallel configuration.

FIG. 14 is a front view for a main body capable of holding up to 10 cells and FIG. 15 is a perspective view for a bottom port that is capable of holding a 10 cell body that is using a parallel configuration to connect to other main bodies that are also using parallel configurations in a cascading parallel configuration. This embodiment has the symbols 1200 on each leg 202A, 202B (with the "+" (positive) symbol shown in FIG. 15). The main body 106 may be slide into this bottom port 104 for a parallel configuration. For the parallel configuration, the bottom port may have a first trough 1402A and a second trough 1402B for the connector/busbar at each side of the main body 106 and a middle trough 1042C for the middle busbar/connector that does extend out from the battery module in the parallel configuration. Like FIGS. 12 and 13, the legs 202A, 202B are labeled to avoid a battery cell being inserted in a wrong orientation and the troughs 1402A, 1402B, 1402C are different from the series configuration and also help the user put the battery cells into the main body 106 in the correct orientation.

In summary, the disclosed battery module or pack is highly scalable depending on the voltage and current requirements of the user. For example, a ten battery cell battery module may be put together using one of the bottom portions 104 in FIGS. 13-15 (depending on the series or parallel configuration), the main body 106 in FIG. 11 and the same side portions 108A, 108B as used for the five cell embodiment. A thirty battery cell battery pack may be created using the three main bodies 106 shown in FIG. 11, three pairs of side portions 108A, 108B and the appropriate bottom portion.

The foregoing description, for purpose of explanation, has been with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A method for assembly of a battery device, the method comprising:

inserting, into a main body having a plurality of individual battery cells, a first and second electrical connector onto each end of the main body so that the first electrical connector is configured to contact an anode of each individual battery cell and the second electrical connector is configured to contact a cathode of each individual battery cell;

clipping on a side portion to each side of the main body, each side portion having a set of extensions adjacent each individual battery cell wherein the set of extensions of both side portions mechanically compress the first and second electrical connectors against each individual battery cathode and anode, respectively; and seating the assembled main body and two side portions into a bottom portion.

2. The method of claim 1 further comprising threading each electrical connector through a connector channel in the bottom portion.

3. The method of claim 1, wherein inserting the first and second electrical connectors further comprises inserting the first electrical connector into a first side of the main body, inserting each of the individual battery cells into a second side of the main body and inserting the second electrical connector into the second side of the main body.

4. The method of claim 3 further comprising attaching a connector onto an end of each electrical connector.

5. The method of claim 1 further comprising installing a battery management system.

6. The method of claim 3, wherein inserting the first and second electrical connectors further comprises sliding a braided tinned copper wire into a slot on each side of the main body.

7. The method of claim 1 further comprising inserting one of five battery cells and ten battery cells into the main body.

8. A method for assembly of a battery device, the method comprising:

inserting a first electrical connector into a first side of a main body having a plurality of individual battery cells so that the first electrical connector is coupled to an anode of each of the plurality of individual battery cells;

inserting a second electrical connector into a second side of the main body so that the second electrical connector is coupled to a cathode of each of the plurality of individual battery cells;

inserting each of the plurality of individual battery cells into the second side of the main body; and clipping a first side portion to the first side of the main body and clipping a second side portion to the second side of the main body, each of the first and second side portions having a set of extensions adjacent each of the plurality of individual battery cells, wherein the set of extensions of the first and second side portions mechanically compress the first and second electrical connectors against each individual battery cathode and anode, respectively, allowing each of the plurality of individual battery cells to contact the first and second electrical connectors.

9. The method of claim 8 further comprising seating the main body and the first and second side portions into a bottom portion.

10. The method of claim 9 further comprising threading each of the first and second electrical connectors through a connector channel in the bottom portion.

11. The method of claim 10 further comprising attaching a connector onto each of the first and second electrical connectors.

12. The method of claim 8 further comprising installing a battery management system.

13. The method of claim 8, wherein inserting the first electrical connector into the first side of the main body further comprises sliding a braided tinned copper wire into a slot on the first side of the main body.

14. The method of claim 8, wherein inserting the second electrical connector into the second side of the main body further comprises sliding a braided tinned copper wire into a slot on the second side of the main body.

15. The method of claim 8, further comprising inserting one of five battery cells and ten battery cells into the main body.

16. A method for assembly of a battery device, the method comprising:

inserting, into a main body having a plurality of individual battery cells, a first and second electrical connector onto each end of the main body so that the first electrical connector is configured to contact an anode of each individual battery cell and the second electrical connector is configured to contact a cathode of each individual battery cell;

clipping a side portion to each side of the main body, each side portion having a set of extensions adjacent each individual battery cell wherein the set of extensions of both side portions mechanically compress the first and second electrical connectors against and along a longitudinal direction of each individual battery cells, respectively; and seating the assembled main body and two side portions into a bottom portion.

* * * * *